United States Patent [19]
Piller

[11] Patent Number: 5,702,732
[45] Date of Patent: Dec. 30, 1997

[54] DEVICE FOR THE PRODUCTION OF PRETZELS

[76] Inventor: Oswald Piller, Ballaufstr. 5, Karlsfeld, D-85757, Germany

[21] Appl. No.: 685,873

[22] Filed: Jul. 24, 1996

[30] Foreign Application Priority Data

Jul. 25, 1995 [DE] Germany .................. 195 27 116.5
Nov. 20, 1995 [DE] Germany .................. 195 43 250.9

[51] Int. Cl.$^6$ ...................................................... A21C 3/08
[52] U.S. Cl. ........................... 425/145; 425/320; 425/323; 425/334; 426/500
[58] Field of Search .................. 426/499, 500; 425/320, 321, 322, 323, 324, 145, 391

[56] References Cited

U.S. PATENT DOCUMENTS

| | | | |
|---|---|---|---|
| 5,382,154 | 1/1995 | Morikawa et al. | 426/500 |
| 5,494,428 | 2/1996 | Piller | 426/500 |

FOREIGN PATENT DOCUMENTS 43 36 329 C1  1/1995  Germany.
44 41 301 C1  1/1996  Germany.

*Primary Examiner*—Khanh P. Nguyen
*Attorney, Agent, or Firm*—Wigman, Cohen, Leitner & Myers, P.C.

[57] ABSTRACT

In addition to a feeding structure for pieces of dough and a removal device, the device for the production of pretzels displays a working platform, a stand with a holding device and two grippers set up on its underside, a structure for measuring the position of the pieces of dough, and a structure for the control of the grippers. In addition to the working platform, retaining clips that can be transported lengthwise from the pieces of dough with sensors assigned to them are provided in the area taken up by the ends of the pieces of dough before the looping process; the sensors are independent of one another and can be transported independently of the end of the piece of dough until they have reached the end of the piece of dough, after which the retaining clips are closed to grasp the piece of dough at a definite place.

5 Claims, 5 Drawing Sheets

5,702,732

DEVICE FOR THE PRODUCTION OF PRETZELS

FIELD OF THE INVENTION

The present invention concerns a device for the production of pretzels.

BACKGROUND OF THE INVENTION

The German patent P 43 36 329 describes a device for the production of pretzels that is provided with a feeding structure for feeding the pieces of dough, with a working platform, with a stand that can be transported both with and against the transport direction of the pieces of dough and that displays a holding device on its underside that is set up to be rotatable and lowerable with two grippers, and which, moreover, is provided with a structure for measuring the length and thus the position of the pieces of dough. To control the grippers as a function of the length, a control structure is provided. To take up the ends of the dough pieces sticking out over the working platform two coated surfaces are provided at both sides of the working platform and are either set up in a recess or in the plane of the coated surface, whereby in the latter case two vertical pins are provided next to both coated surfaces, and two sensors are set up next to the pins, which are connected to the control structure.

The cost of construction for a device for the production of pretzels can be reduced with this known, advantageous device by having the two grippers on the underside of the holding device take the same position above the coated surface after returning from the looping process and for the next looping process, and by having them grasp the two ends of the piece of dough independently of each other only when a sensor determines that the appropriate end of the piece of dough has completely passed by. This means in practice, however, that the two grippers are controlled independently of one another and take on a specified distance from each other on the holding device for a specified pretzel size.

To improve the reliability of such a device, increase the operating speed, and with it considerably decrease the rejection rate, i.e., the number of incompletely looped pretzels, while at the same time raising the number of flawlessly looped pretzels per unit of time, an improved device for the production of pretzels from preformed pieces of dough was proposed in the German patent P 44 41 301, which comprises a feeding structure, a working platform with several bent stopping devices, a transportable stand with a lowerable and twistable holding device, two grippers fastened on the underside of the holding device, which are connected to a structure to measure the length of the piece of dough, a structure to control the grippers, two coated surfaces on both sides of the working platform, two vertical stationary pins near the two outer edges of the platform, and two sensors near the pins that are connected to the control structure. In the direct proximity of each sensor and outside the working platform, a stationary clip is provided in each case for holding the piece of dough, which is connected to the control structure and operated by it. The lengths of the edges of both of the coated surfaces extending on both sides of the working platform are, at the same time, limited by the guiding edges, whereby the coated surfaces are provided either with rolls set up parallel next to each other or consist of a continuous loop, which wraps around two freely revolving guide rolls. When forming the end of the piece of dough into a U-shape, the ends of the piece of dough are pulled over the coated surfaces until the clamps take hold of them so that friction, i.e., sticking to the coated surfaces, is minimized.

SUMMARY OF THE INVENTION

The problem of the present invention is to improve the reliability of a device for the production of pretzels and, at the same time, to increase the operation speed.

An advantage of the invention is that the time it takes to grasp both of the ends of the piece of dough of a delivered, unworked piece of dough transferred to the working platform and the coated surfaces and to loop the U-shaped, bent pieces of dough into a finished pretzel is substantially shortened. In addition, the grippers grasp the ends of the piece of dough for the looping process at the right spot with very great reliability because of the definite position of the piece of dough end. This reduces the rejection rate to a great extent.

BRIEF DESCRIPTION OF THE DRAWINGS

In the following the invention is more particulary characterized through the representation of an advantageous working example. Shown are the following figures.

DETAILED DESCRIPTION OF THE INVENTION

Figure 1:
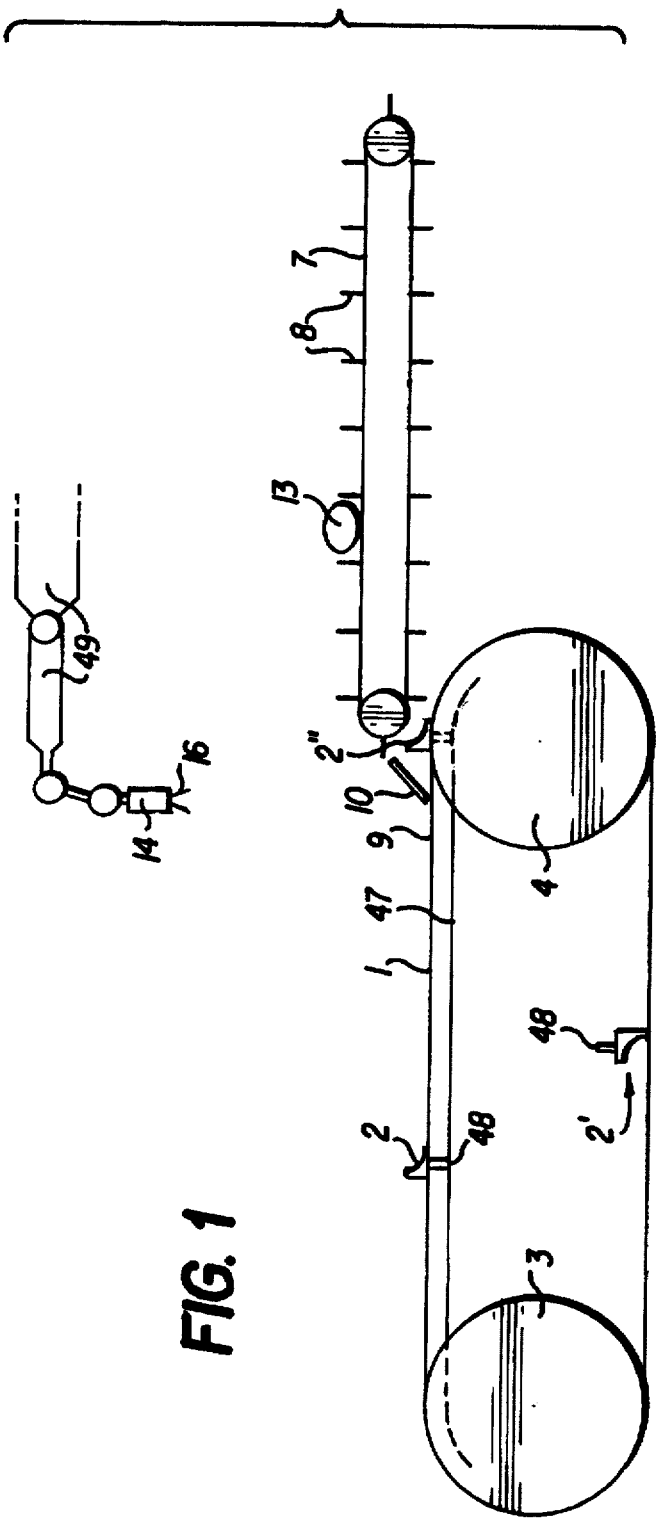
FIG. 1 shows a schematical cross section through the device according to the invention.

In the case of the cross section through the device shown in FIG. 1, a working platform in the form of a continuous loop rotating around two reversing wheels (3, 4) is designated as (1). The continuous loop (1) can consist of a plurality of relatively rigid sections, which are connected together like links in such a way that the articulated axes extend vertically to the feeding structure so that the continuous loop (1) runs problem-free around the wheels (3, 4).

Figure 2:
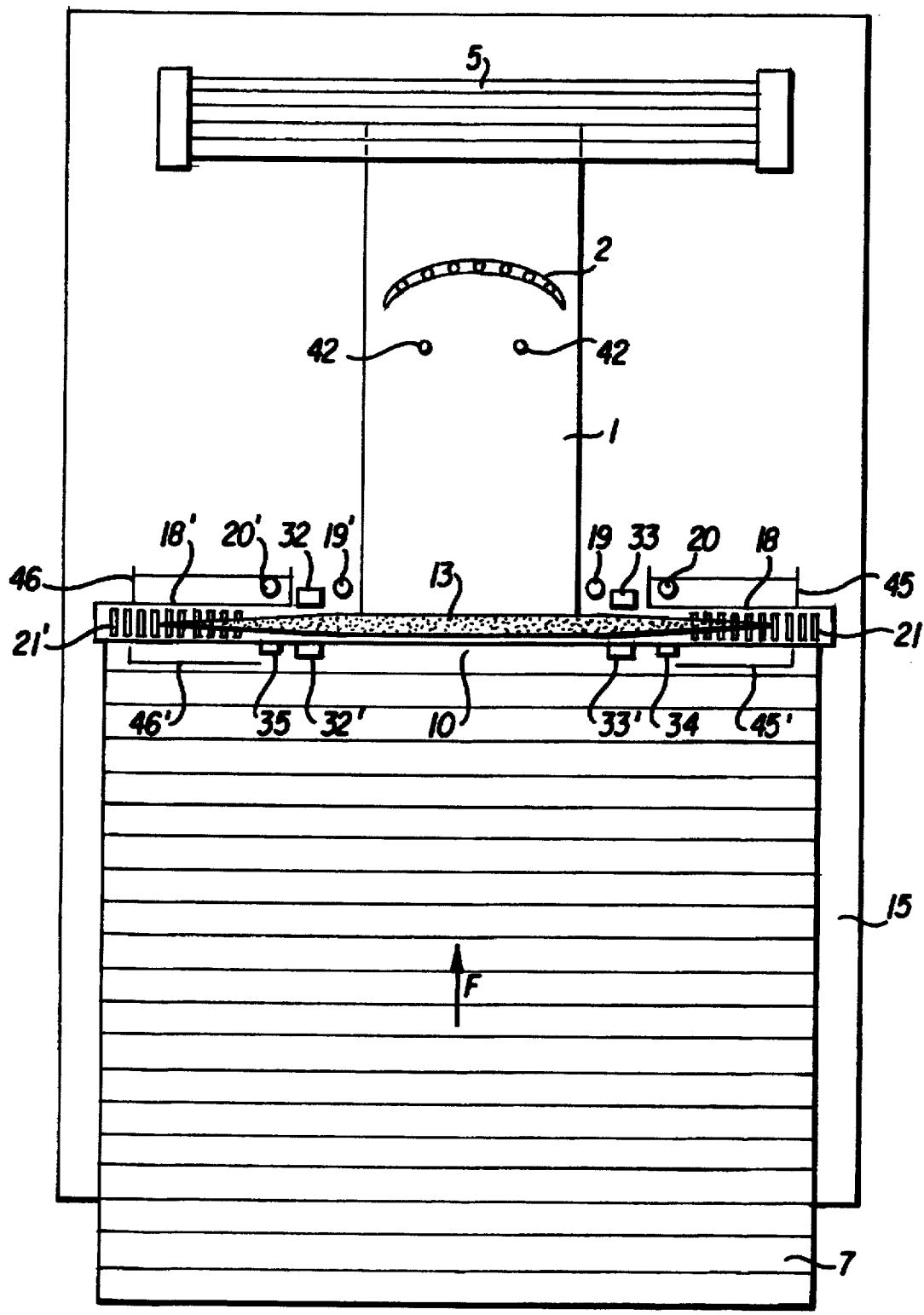
FIGS. 2 and 3 show two top views of fundamental parts of the device.
Figure 3:
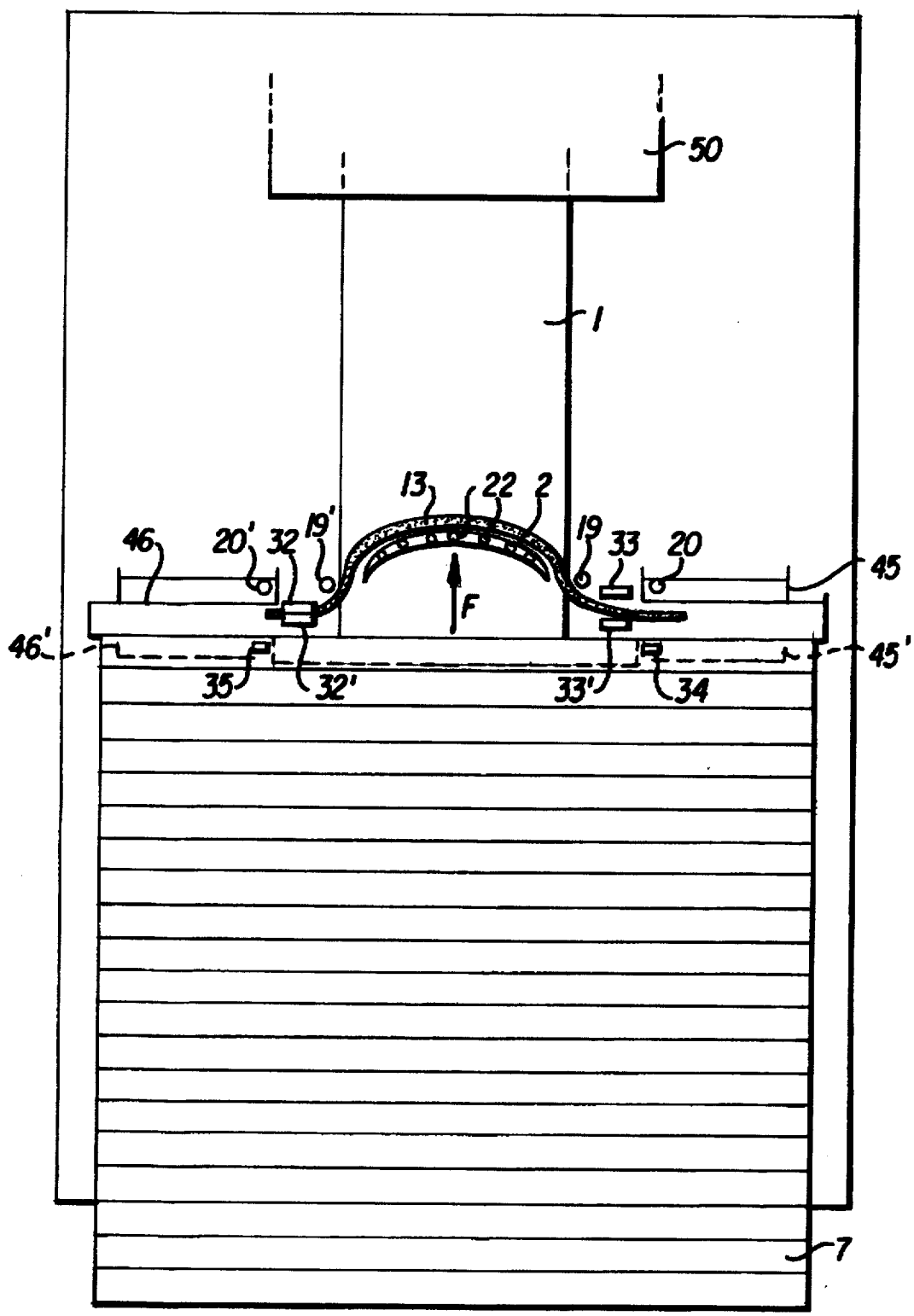

Alongside the center axis of the working platform (1) a variety of curved stopping devices (2, 2', 2") set up with spaces between each other are provided for, with whose help a delivered piece of dough (13) is shaped into a U. These curved stopping devices (2) (which are represented in FIGS. 2 and 3 in a top view) are set up in a groove in the individual sections of the working platform (1) in such a way that they are adjustable between a working position (designated as 2, 2" in FIG. 1), in which they project from the working platform to take up the middle part of a piece of dough, and a resting position (designated as 2' in FIG. 1), in which they are lowered into the working platform so that the upper edge of the stopping device is in alignment with the plane of the working platform.

This shifting of the curved stopping devices (2, 2', 2") takes place most simply in a purely mechanical fashion by means of a slide bar (47) on which spring-loaded supports (48) slide that are set up on the underside of the curved stopping devices and that run parallel to the platform and are set up underneath the working area of the working platform (1) so that after the rotation of the wheel (4) towards the feeding structure, the supports (48) come into contact with the slide bar (47), and the appropriate curved stopping device is pressed out of the groove from the working platform and upwards, as is indicated by the two reference numbers (2, 2"). After leaving the slide bars, i.e., in the guiding area of the wheel (3), the curved stopping devices are lowered into the correspondingly formed grooves in the working platform due to the spring action so that they take on the position designated as 2' in FIG. 1.

Figure 5:
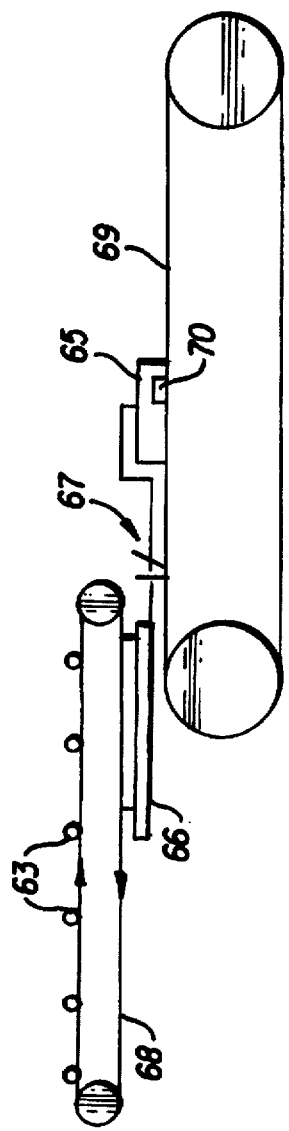
FIG. 5 shows a side view of another working example of the device according to the invention.
Figure 6:
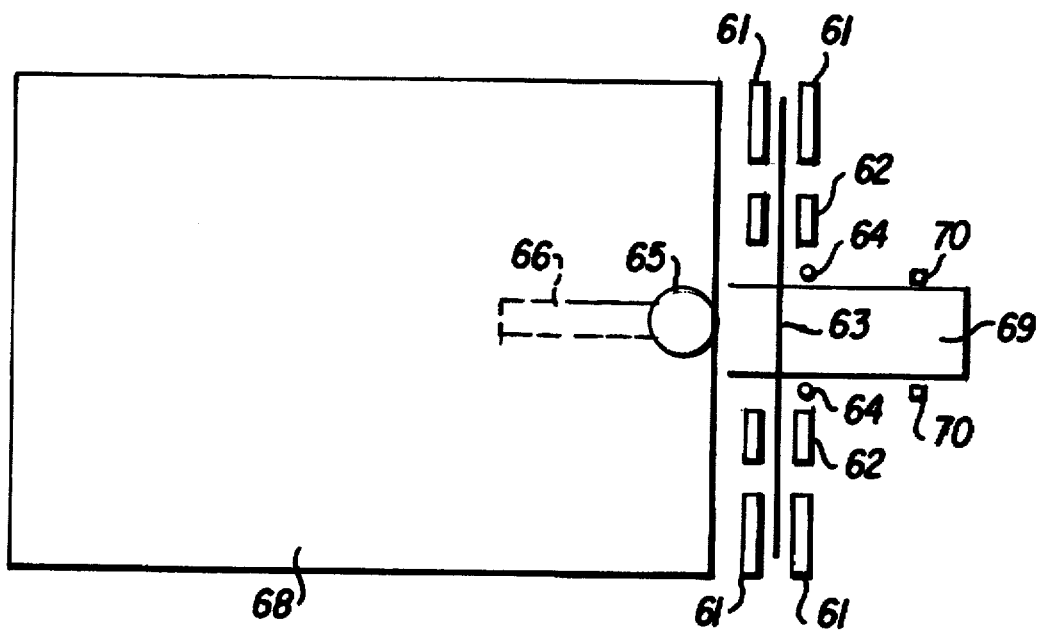
FIG. 6 shows a top view of this device with a retracted plate.
Figure 7:
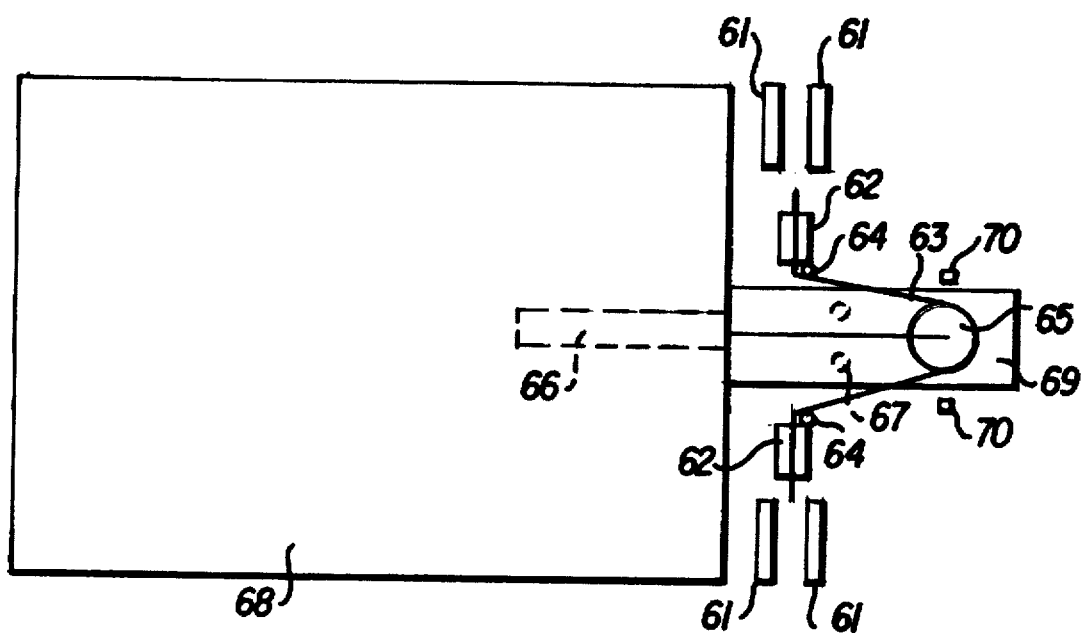
FIG. 7 shows a top view of this device with an extended plate.

Instead of the curved stopping device, a pressure cylinder with a piston rod can also be set up in the middle above the working platform, which is designed as a continuous loop, whereby a freely revolving plate at the free end of the piston rod is suspended in a plane parallel to the plane of the working platform and takes on the shaping of the piece of dough into a U, as is represented in the FIGS. 5 to 7.

Moreover, in FIG. 1 the feeding structure for the preformed pieces of dough (13) is designated as (7), whereby bars (8), which insure that the spacing between the pieces of dough (13) is maintained, can be provided between the individual pieces of dough. A transfer device that transfers the pieces of dough to the working platform (1) is designated as (10), and a stand is designated as (49), which is provided with a holding device (14) on whose underside two grippers (16) for the ends of a piece of dough are provided. The stand (49) consists, preferably, of a commercial robot, such as the FANUC firm sells under the designation LR MATE 100, that is rotatable and tiltable in all three directions in space.

Figure 4:
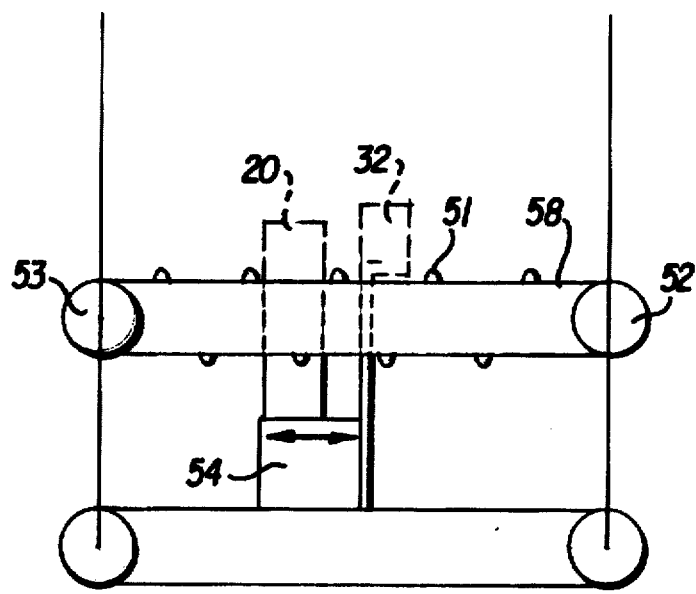
FIG. 4 shows a vertical section through one of the two coating surfaces.

In the top view of a working example of the device according to the invention represented in FIG. 2, the feeding direction of the feeding device (7) for the pieces of dough is designated by the arrow F. A piece of dough that is fed from the feeding device and with the help of the transfer device (10) from the working platform (1) is designated as (13). The width of the working platform (1) is considerably smaller than that of the feeding structure and corresponds approximately to the width of a completely looped pretzel. This means that, after the transfer of the piece of dough (13) to the working platform (1), both ends of the pieces of dough stick out over the working platform (1) and come to a rest on the coated surfaces (18, 18'). Advantageously, the lengths of the edges of both coating surfaces (18, 18') are limited by guiding edges (45, 45', 46, 46') for the dough edges so that they take on a definite position on the coating surfaces. To make the sliding process easier during the shaping of the piece of dough (13) into a U by means of a curved stopping device (2), the coated surfaces (18, 18') consist of a continuous loop (58) wrapped around two guiding rolls (52, 53), whose outer surface is provided with a plurality of ribs (51) arranged crosswise and in the running direction as shown in FIG. 4.

Two stationary pins, essentially set up vertically, are designated as (19, 19'); they serve to shape the dough into a U when feeding one of the stopping devices (2) (or one of the plates) while taking along the middle section of the piece of dough (13) as both pieces of dough glide by on the vertical pins (19, 19'), whereby the pins can also be designed to rotate around their vertical longitudinal axes.

Between the two pins (19, 19') and the guiding edges (45, 46) of both of the coating surfaces sensors are provided, which, for the selected working example, consist of an infrared sensor (20, 20') and a receiver (34, 35) provided in the opposite guiding edges (45', 46') and which produce a signal for the control structure when reaching the appropriate end of the piece of dough.

In each case a retaining clip for the appropriate end of the piece of dough is provided between the sensors (20, 20') and the guiding pin (19 or 19'), whereby each retaining clip is provided with two pair of movable jaws (32, 32'; 33, 33') that are directed upwards. With the position of the piece of dough (13) shown in FIG. 2, each jaw of each retaining clip is opened. Each retaining clip is connected to the control structure and is capable of being actuated by it. The operation of the two retaining clips and the sensors set up in their direct proximity by means of the control structure (not represented) takes place in such a way that after the transfer of a piece of dough (13) onto the working platform, the two coated surfaces (18, 18') that are connected together are transported, whereby each unit consisting of a retaining clip and the appropriate sensor is transported from its end position, where it comes to a rest in direct proximity to the working platform (1) as far outwards, i.e., in the direction of the appropriate end of the piece of dough, until the sensor detects the end of the piece of dough. At this point in time the shifting movement of the unit stops and the two clamping jaws (32, 32'; 33, 33') close and hold the end of the piece of dough fast, whereby they each leave a space at the end of the piece of dough that is specified by the sensor, definite, but capable of being reproduced. The movement of both units consisting of retaining clip and sensor takes place independently of each other so that even with pieces of dough that are of unequal lengths, which consequently take on positions that are different from one another on the coated surface, the end of the piece of dough is in each case grasped at the same place, measured from the absolute end (e.g., 2 cm from the end).

As the feeding movement either of the curved stopping device or the freely rotating suspended plate takes place, causing the dough end (13) to be shaped into a U, the units consisting of retaining clips and appropriate sensors are transported again by a motor (54) in the direction of their initial positions in direct proximity to the working platform, as is represented schematically in FIG. 4. At the same time, the continuous loops (58) forming coated surfaces with the ribs located on them, which have the shape of a toothed belt, are set in motion so that they move themselves in the direction of the moving ends of pieces of dough at the same speed as the pieces of dough, namely through the pressure of the ends of the pieces of dough lying on them and the movement given them by the retaining clips with the help of the free-running guiding rolls (52, 53). In any case, a lengthening of the piece of dough is avoided by the reduced adhesion to the surface of the coated surfaces. The continuous bands (58) can move freely in the direction of the working platform and come to a standstill as soon as the lowered grippers have grasped and lifted the ends of the pieces of dough.

In addition, in FIG. 2 a transfer and mining device for the pretzels that have already been looped is designated as (5), e.g., to transfer them to the conveyor belt set up underneath the underside of the working platform, as is more particularly described in the aforementioned patent, the disclosure of which is incorporated herein by reference.

In FIG. 3 the device according to the invention is represented in a state in which one of the curved stopping devices (2) began to form the piece of dough lying tangential to it into a U while advancing in the direction of the arrow (F) by forcing the two ends of the pieces of dough through the pins (19, 19') into the corresponding position.

For the subsequent looping process into a finished pretzel it is necessary that the grippers (16) represented in FIG. 1 on the underside of the holding device (14) are lowered, at the right place and the right time. The sensors (20, 20') and the receivers (34, 35), which can be electric or optical, measure the position of each piece of dough (13) by giving off a signal to the control device directly after reaching the end of the piece of dough. Then, according to the invention, directly after this signal that announces that it has reached the appropriate end of the piece of dough occurs, the appropriate retaining clip is put into action by closing the two jaws (32, 32' or 33, 33'), and the appropriate end of the piece of dough is held fast. The curved stopping device (2) that is moving forward continues with the formation of the U, comes to a standstill after running through the specified stretch of the curved stopping device (2), and the two grippers (16) on the underside of the holding device (14) of the stand (49) advantageously designed as a robot arm are lowered to a specified place to grasp, raise, and loop the ends of the piece of dough by 360° and after the respective process to move them in the direction of the arrow (F), and to press them onto the corresponding sections of the middle parts, thus ending the looping process.

In FIG. 3 the state is represented in which the left end of the piece of dough (13) has already reached sensor (20') and receiver (35) so that both jaws (32, 32') of the appropriate retaining clips are closed to hold the end of the piece of dough fast. This means that the opposite end (in the drawing on the right) of the piece of dough that is longer is carried away by the retaining clips and sensor until this end also reaches the appropriate sensor (20) and receiver (34), whose signal closes the second clip with both of the appropriate jaws (33, 33'). In FIG. 3 the jaws (33, 33') are represented in an opened state and their control is obtained through the appropriate sensors so that the ends of the pieces of dough (13) take on exactly the same position before the looping process. As a result, the lowerable grippers (16) on the holding device (14) can also take on the same specified position for a given pretzel size. It is understood that at the same time that the grippers (16) are lowered and the clips grasp the ends of the pieces of dough, the clips are opened so that the actual looping process can be carried out.

In FIG. 3 yet another feeding device for the completely looped pretzel is designated as (50), which consists of a slide plate (50) that extends over the entire width of the working platform (1) and directly connects to it; from this feeding device the completely looped pretzels are further transported to a baking and storing station without being turned.

FIG. 4 shows a longitudinal section through the area of one or both coated surfaces, which are formed by a continuous loop (58), which is provided with a plurality of ribs (51) disposed at regular intervals from each other on its outer side, so that the continuous loop has the form of a toothed belt. The continuous loop (58) wraps around two guiding rollers that are designated as (52) and (53). The guiding rollers can be a selected to be running free in one direction so that the continuous loop is, in the end, carried along by the movement of the end of the piece of dough unrolled on it. It is just as possible that the continuous loop is provided with its own motor, which is operated by the control device so that in each case the same speed between the retaining clips and continuous bands can be maintained when shaping the piece of dough into a U.

In FIGS. 5 to 8 a second working example of a device according to the invention is represented, of which once again only the fundamental parts are shown. It has a feeding structure (68) in the form of a feeding belt on which the finished, rolled out pieces of dough (63) are fed onto the working platform, which is set up somewhat deeper in its extension in the form of a working belt (69). In particular, FIG. 5 reveals that a pressure cylinder (66) with a piston rod (67) that can be moved in and out is set up near the transition point of the pieces of dough (63) from the feeding belt (68) to the working belt (69) below the feeding band (68) and above the working belt (69), and which is set up, as is evident in FIGS. 6 and 7, in the middle and essentially horizontally so that its longitudinal axis lies in the feeding direction of both belts. On the free end of the piston rod (67) moving back and forth under the influence of the pressure cylinder (66), a freely rotating plate (65), set up essentially on a horizontal plane, is suspended, which, in place of the curved stopping devices that were described in connection with the working example according to FIGS. 1 to 4, accomplishes the shaping of the piece of dough ([6]3) into a U and closely fits on the working belt while it is being fed (69).

From FIGS. 6 and 7 it is evident that in this working example light sensors (61) are provided as well as rotating reversing pins (64) and clips (62), which are controlled by the light sensors in such a way that after the appropriate end of the piece of dough completely passes by, a signal to the control structure is given off. This signal, which announces that the appropriate end of the piece of dough has completely passed by, sets into action the appropriate retaining clip (62) so that both jaws of each clip are closed to hold the appropriate piece of dough near its end.

The shaping of the piece of dough is brought about by the freely rotating suspended plate (65), which, after the corresponding control of the pressure cylinder (66), is transported by the piston rod (67) from its initial position shown in FIG. 6 into the final position shown in FIG. 7, during which the piece of dough (63) is given its shape. Through the forward movement of the piece of dough (63) with the help of the freely rotating suspended plate (65), whose outer edge can be provided with a material that lowers the adhesion of the piece of dough, e.g., felt, the ends of the pieces of dough slide by the sensors, i.e., the light sensors (61), and reversing pins (64) until they are grasped by the retaining clips (62) and are held fast. If one end is held fast by the appropriate clip, a tearing of the piece of dough is prevented while it is being shaped by the rotating suspension of the plate (65).

After moving along the specified stretch, as represented in FIG. 7, the piston rod (67) with the plate (65) set up on it comes to a standstill and the grippers (not shown) on the underside of a holding device formed as a robot arm are lowered onto a specified position to grasp the end of the piece of dough, lift it, loop it by 360°, lower it after the respective process, and press it onto the corresponding sections of the middle part—with which the pretzel looping process is ended.

As represented in the FIGS. 4a and 4b described on page 9 of the German patent P 44 41 301 mentioned at the outset, each gripper on the underside of the holding device of the robot arm, which grasps the end of the U-shaped piece of dough, lifts it, loops it into a pretzel, and then sets it down, is provided with two controllable clamping jaws and in each case with a presser, which is set up inside both height-adjustable clamping jaws. This presser serves to prevent the ends of the piece of dough from sticking to the grippers after the setting-down step is followed by lifting and removing the grippers from the completely looped pretzel, and to prevent lifting a small piece with it, which would result in a incompletely looped pretzel.

Each presser is operated on a purely mechanical basis through a tappet parallel to it but set up outside the clamping jaws, which is adjustable in its longitudinal axis and which is provided, for example, with a hemisphere on its underside, which is supported appropriate clip, a tearing of the piece of dough is prevented while it is being shaped by the rotating suspension of the plate (65).

After moving along the specified stretch, as represented in FIG. 7, the piston rod (67) with the plate (65) set up on it comes to a standstill and the grippers (not shown) on the underside of a holding device formed as a robot arm are lowered onto a specified position to grasp the end of the piece of dough, lift it, loop it by 360°, lower it after the respective process, and press it onto the corresponding sections of the middle part—with which the pretzel looping process is ended.

As represented in the FIGS. 4a and 4b described on page 9 of the German patent P 44 41 301 mentioned at the outset, each gripper on the underside of the holding device of the robot arm, which grasps the end of the U-shaped piece of dough, lifts it, loops it into a pretzel, and then sets it down, is provided with two controllable clamping jaws and in each case with a presser, which is set up inside both height-adjustable clamping jaws. This presser serves to prevent the ends of the piece of dough from sticking to the grippers after the setting-down step is followed by lifting and removing the grippers from the completely looped pretzel, and to prevent lifting a small piece with it, which would result in a incompletely looped pretzel.

Each presser is operated on a purely mechanical basis through a tappet parallel to it but set up outside the clamping jaws, which is adjustable in its longitudinal axis and which is provided, for example, with a hemisphere on its underside, which is supported on a stopping device (70) that is set up outside the working belt (69) but in the direct proximity of the edge and on which the tappet is supported when the grippers with the ends of the pieces of dough held fast in them are lowered.

It is planned at the same time that each stopping device (70) can be operated hydraulically or pneumatically and is controlled by the control structure in such a way that each stopping device (70) comes to meet the appropriate tappet when the grippers are lowered so that the clamping jaws are already opened shortly before they touch the middle section of the U-shaped piece of dough; at the same time, the presser is lowered between the clamping jaws by raising the tappet and insures that the ends of the pieces of dough are pressed onto the corresponding positions of the U-shaped middle part. A corresponding coating of the impact surface of the pressers coming in contact with the ends of the pieces of dough, e.g., with felt, reduces the chance of the ends of the pieces of dough sticking when the grippers are raised, together with the associated pressers, after ending the looping process, all of which minimizes the rejection rate. The stopping device (70) that can be operated pneumatically or hydraulically by the control structure thus acts as a release structure to open the clamping jaws of the lowerable grippers, connected by lowering the pressers located between the grippers. It is also contemplated according to the invention that two rocking plates are set up next to the working belt (63), whereby each rocking plate displays an arm (73, 73') positioned so it can swivel in a vertical plane on a tipping axis (74, 74'); the arm extends crosswise with respect to the feeding device and in part at a vertical distance above the working belt. The end of each arm (73, 73') confronting the other arm is then provided with a molded body (72, 72') suspended downwards, whose diameter is selected so that it matches both back openings of the completely looped pretzel, as viewed from the feeding direction of the working belt (63). The molded body (72, 72') can be a plate or a cylinder that is attached either rigidly or freely rotating to the underside of the appropriate end of the corresponding arm (73, 73').

Figure 8:
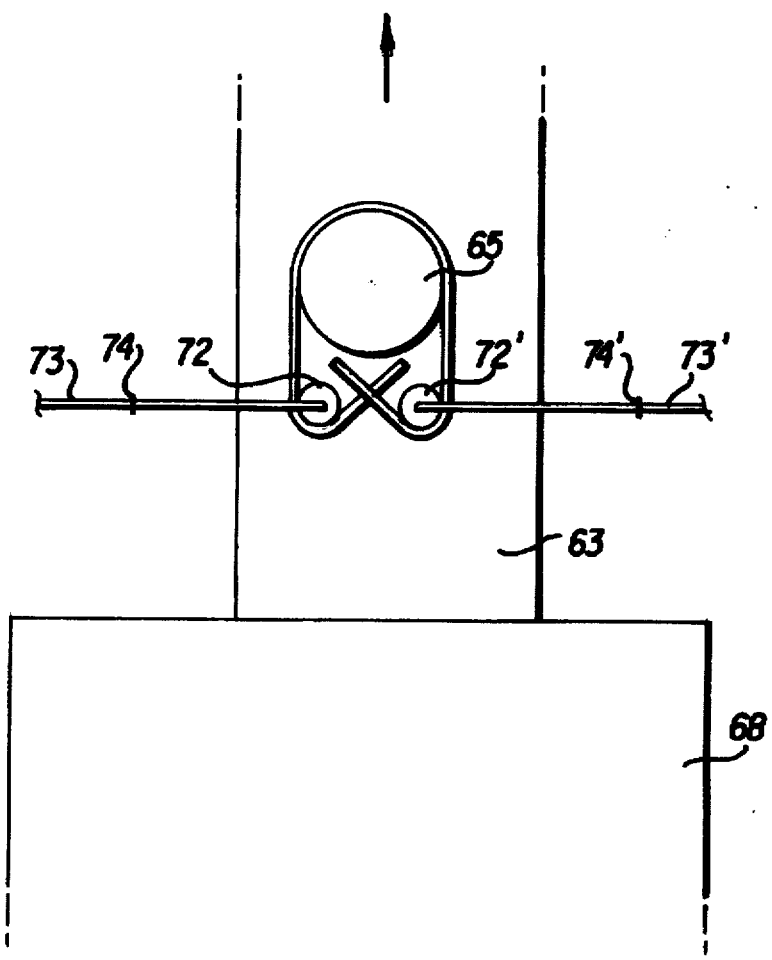
FIG. 8 shows an enlarged representation of the device with two roller plates.

Each arm is provided with a mechanical, pneumatic, or electric actuation structure (not shown) in such a way that it is tiltable around the appropriate tipping axis (74, 74') in an essentially vertical direction in such a way that the appropriate molded body (72, 72') is lowered and at the same time grasps into the looping area of the pretzel that has just been looped and takes on the position indicated in FIG. 8, in which the pretzel looping process is initiated through the grippers (not shown), but has not yet ended. The operation of the rocker plates at regular intervals takes place by means of a rocker lever (not shown) controlled by the control structure in such a way that the two rocker plates are lowered into their working position only when the plate (65) has returned to its initial position in accordance with FIG. 6 after the formation of the U.

After the looping process the free ends of the appropriate grippers are pressed onto the corresponding sections of the piece of dough. Thus, an undesired advance of the corresponding sections of the piece of dough wrapped around the molded body (72, 72') in the direction of the plate (65) is prevented with certainty.

After ending the looping process the two molded bodies (72, 72') are raised by the tilting motion of the arms (73, 73') around the appropriate tipping axis (74, 74') so that the completely looped pretzel can be transported forward and the next looping process of a corresponding piece of dough can be initiated.

As a result of the provision of the rocker plates consisting of two parts, the production speed, i.e., the number of completely looped pretzels per unit of time, can be considerably raised without the creation of undesired pretzel shapes. Both lowered molded bodies (72, 72'), together with the appropriate grippers, provide for a streamlined, visually flawless pretzel.

I claim:

1. Device for the production of pretzels from pre-formed pieces of dough, comprising a feeding means for feeding the pieces of dough to a working platform, which is provided with a plurality curved stopping devices, a stand that can be transported both with and against a transport direction of the pieces of dough, a holding device set up so it can rotate and be lowered on an underside of the stand around a central axis, two grippers for the pieces of dough set up on the underside of the holding device, a structure for measuring the position of the piece of dough, with a control means for controlling the grippers as a function of the position of the piece of dough, the working platform having a smaller width than the width of the feeding means for the piece of dough and being arranged symmetrically to the longitudinal axis of the feeding means, two coated surfaces that extend to both sides of the working platform, with two vertical, stationary pins extending out the working platform near both outer edges and next to both coated surfaces when viewed in the transport direction, sensors connected to the control means, and two retaining clips for the pieces of dough located in the direct proximity of each of said sensors and outside of the working platform, which are connected to and operated by the control means by a respective retaining clip and a respective sensor, forming a unit capable of being transported back and forth lengthwise on each of said coated surfaces, each unit being controlled independently of the unit by the control means in such a way that each sensor transmits a signal to the control means after reaching an appropriate end of the piece of dough, which causes the control means to close the retaining clip so that it gasps the end of the piece of dough at a specified location near the end of the piece of dough, after which it returns together with its respective sensor to its initial position near the working platform.

2. Device for the production of pretzels from pre-formed pieces of dough, comprising a feeding means for feeding the pieces of dough to a working platform, which is provided with a plurality of curved stopping devices, a stand that can be transported both with and against a transport direction of the pieces of dough, a holding device set up so it can rotate and be lowered on an underside of the stand around a central axis, two grippers for the pieces of dough set up on the underside of the holding device, a structure for measuring the position of the piece of dough, with a control means for controlling the grippers as a function of the position of the piece of dough, the working platform having a smaller width than the width of the feeding means for the piece of dough and being arranged symmetrically to the longitudinal axis of the feeding means, two coated surfaces that extend to both sides of the working platform, with two vertical, stationary pins extending out the working platform near both outer edges and next to both coated surfaces when viewed in the transport direction, sensors connected to the control means, and two retaining clips for the pieces of dough located in the direct proximity of each of said sensors and outside of the working platform, which are connected to and operated by the control means by a respective retaining clip and a respective sensor, forming a unit capable of being transported back and forth lengthwise on each of said coated surfaces, each unit being controlled independently of the unit by the control means in such a way that each sensor transmits a signal to the control means after reaching an appropriate end of the piece of dough, which causes the control means to close the retaining clip so that it grasp the end of the piece of dough at a specified location near the end of the piece of dough, after which it returns together with its respective sensor to its initial position near the working platform, wherein two coated surfaces comprise two continuous loops with ribs that run crosswise with respect to the transport direction around two freely running guiding rolls, said surfaces being movable in the direction of the working platform and come to rest after the removal of the end of the piece of dough by the grippers.

3. Device for the production of pretzels from pre-formed pieces of dough, comprising a feeding belt for the pieces of dough, a working belt, a robot arm that can be transported both with and against the transport direction of the pieces of dough, a holding device set up on the underside of the robot arm that can rotate around a central axle and can be lowered, with two grippers for the pieces of dough set up on the underside of the holding device, means for measuring the length and thus the position of the pieces of dough, means for controlling the grippers as a function of the length of the pieces of dough, two vertical, rotary reversing pins that are set up near the two outside edges of the working belt, light sensors set up next to the pins and being connected to the control means, two clips for holding the ends of the dough, a pressure cylinder provided near a transition point of the pieces of dough, the cylinder having a piston rod with a plate set up to be essentially horizontal, two rocker plates set up next to the working belt, each rocking plate having an arm positioned so that it can swivel on a tipping axis in a vertical plane, extending crosswise with respect to the feeding device at a vertical distance over the working belt one end of each arm carrying a molded body which is raised by a tilting motion of the arms under control of the control means so that the looped pretzel can be transported forward.

4. Device according to claim 3, characterized by the fact that the molded body is a cylinder matched to the appropriate shape of the piece of dough.

5. Device according to claim 3, characterized by the fact that the molded body is a plate matched to the appropriate shape of the piece of dough.

* * * * *